(12) United States Patent
Langlois et al.

(10) Patent No.: US 11,043,844 B2
(45) Date of Patent: Jun. 22, 2021

(54) STACKABLE BATTERY PACK WITH WIRELESS CHARGING

(71) Applicant: Otter Products, LLC, Fort Collins, CO (US)

(72) Inventors: Christopher R. Langlois, Fort Collins, CO (US); John P. Fitzgerald, Fort Collins, CO (US); Joshua K. Peterson, Fort Collins, CO (US); Will A. Boehner, Fort Collins, CO (US)

(73) Assignee: Otter Products, LLC, Fort Collins, CO (US)

( * ) Notice: Subject to any disclaimer, the term of this patent is extended or adjusted under 35 U.S.C. 154(b) by 0 days.

(21) Appl. No.: 16/519,895

(22) Filed: Jul. 23, 2019

(65) Prior Publication Data

US 2020/0059114 A1 Feb. 20, 2020

Related U.S. Application Data

(63) Continuation of application No. 16/400,489, filed on May 1, 2019, now Pat. No. 10,958,103.
(Continued)

(51) Int. Cl.
*H02J 50/10* (2016.01)
*H02J 7/00* (2006.01)
(Continued)

(52) U.S. Cl.
CPC .............. *H02J 50/10* (2016.02); *H02J 7/025* (2013.01); *H02J 50/90* (2016.02); *H02J 7/0013* (2013.01);
(Continued)

(58) Field of Classification Search
CPC ........ H02J 50/10; H02J 50/90; H02J 2207/40; H02J 7/0044; H02J 7/0013; H02J 7/00045; H02J 7/00036
See application file for complete search history.

(56) References Cited

U.S. PATENT DOCUMENTS

| 4,312,580 A | 1/1982 | Schwomma et al. |
| 4,413,221 A | 11/1983 | Benjamin et al. |

(Continued)

FOREIGN PATENT DOCUMENTS

| CN | 103171477 A | 6/2013 |
| EP | 2445079 A1 | 4/2012 |

(Continued)

OTHER PUBLICATIONS

Avido LLC, "Avido-Wiba-Manual_7_18_R3", downloaded from https://avidopower.com/wp-content/uploads/2019/02/Avido-Wiba-Manual_7_18_R3.pdf on Jul. 9, 2019, 13 pages.

(Continued)

*Primary Examiner* — Richard Isla
*Assistant Examiner* — Johali A Torres Ruiz

(57) ABSTRACT

A rechargeable battery pack includes a rechargeable battery, electrical circuitry, and an inductive coil for wirelessly transmitting power to an electronic device. The rechargeable battery pack further includes a first set of electrical contacts to interface with electrical contacts of a charging base. The rechargeable battery pack is programmed to transmit a first data communication including a first identification code to the charging base through the first set of electrical contacts and receive first electrical power from the charging base if the identification code is verified. The rechargeable battery pack includes a second set of electrical contacts positioned on a top surface of the rechargeable battery pack for providing second electrical power to a second instance of the rechargeable battery pack. The second electrical power provided to the second instance of the rechargeable battery pack is a portion of the first electrical power received from the charging base.

15 Claims, 8 Drawing Sheets

Related U.S. Application Data

(60) Provisional application No. 62/718,521, filed on Aug. 14, 2018.

(51) Int. Cl.
  *H02J 7/02* (2016.01)
  *H02J 50/90* (2016.01)

(52) U.S. Cl.
  CPC ......... *H02J 7/00036* (2020.01); *H02J 7/0044* (2013.01); *H02J 7/00045* (2020.01); *H02J 2207/40* (2020.01)

(56) References Cited

U.S. PATENT DOCUMENTS

| | | | |
|---|---|---|---|
| 4,957,205 A | 9/1990 | Rose | |
| 5,140,310 A | 8/1992 | DeLuca et al. | |
| 5,311,112 A | 5/1994 | Creaco et al. | |
| 5,325,040 A | 6/1994 | Bogut et al. | |
| 5,541,813 A | 7/1996 | Satoh et al. | |
| 5,583,742 A | 12/1996 | Noda et al. | |
| 5,669,004 A | 9/1997 | Sellers | |
| 5,681,122 A | 10/1997 | Burke | |
| 5,814,968 A * | 9/1998 | Lovegreen | H02J 7/0013 320/113 |
| 5,933,812 A | 8/1999 | Meyer et al. | |
| 6,005,368 A | 12/1999 | Frame | |
| 6,043,626 A | 3/2000 | Snyder et al. | |
| 6,058,356 A | 5/2000 | Swanson et al. | |
| 6,075,341 A * | 6/2000 | White | H01M 2/1055 320/114 |
| 6,129,321 A | 10/2000 | Minelli et al. | |
| 6,169,384 B1 | 1/2001 | Shannon | |
| 6,184,654 B1 | 2/2001 | Bachner et al. | |
| 6,249,256 B1 | 6/2001 | Luxon et al. | |
| 6,304,459 B1 | 10/2001 | Toyosato et al. | |
| 6,317,313 B1 | 11/2001 | Mosgrove et al. | |
| 6,327,152 B1 | 12/2001 | Saye | |
| 6,356,058 B1 | 3/2002 | Maio | |
| 6,388,877 B1 | 5/2002 | Canova et al. | |
| 6,405,049 B2 | 6/2002 | Herrod et al. | |
| 6,456,487 B1 | 9/2002 | Hetterick | |
| 6,504,710 B2 | 1/2003 | Sutton et al. | |
| 6,532,152 B1 | 3/2003 | White et al. | |
| 6,538,413 B1 | 3/2003 | Beard et al. | |
| D475,417 S | 6/2003 | Wintersteiger | |
| D476,376 S | 6/2003 | Wintersteiger | |
| 6,944,782 B2 | 9/2005 | Mueller et al. | |
| D524,282 S | 7/2006 | Beasley et al. | |
| D526,973 S | 8/2006 | Gates et al. | |
| 7,116,079 B2 | 10/2006 | Bayne et al. | |
| D558,207 S | 12/2007 | Ikeda et al. | |
| D558,208 S | 12/2007 | Ikeda et al. | |
| D558,209 S | 12/2007 | Ikeda et al. | |
| 7,312,984 B2 | 12/2007 | Richardson et al. | |
| 7,318,521 B2 | 1/2008 | Lau | |
| 7,359,184 B2 | 4/2008 | Lord | |
| 7,400,917 B2 | 7/2008 | Wood et al. | |
| 7,403,613 B2 | 7/2008 | Liou | |
| D575,289 S | 8/2008 | Kuo et al. | |
| D585,898 S | 2/2009 | Skurdal | |
| 7,612,997 B1 | 11/2009 | Diebel et al. | |
| 7,728,551 B2 | 6/2010 | Reed et al. | |
| 7,782,610 B2 | 8/2010 | Diebel et al. | |
| 7,868,585 B2 | 1/2011 | Samowsky et al. | |
| 7,876,272 B2 | 1/2011 | Dou et al. | |
| 7,888,629 B2 | 2/2011 | Heslin et al. | |
| 7,889,498 B2 | 2/2011 | Diebel et al. | |
| 8,013,572 B2 | 9/2011 | Rodgers | |
| 8,041,029 B2 | 10/2011 | Wiegers | |
| 8,208,980 B2 | 6/2012 | Wong et al. | |
| 8,214,003 B2 | 7/2012 | Wong et al. | |
| 8,286,013 B2 | 10/2012 | Chen et al. | |
| 8,310,200 B2 | 11/2012 | Matouka et al. | |
| 8,367,235 B2 | 2/2013 | Huang | |
| D680,541 S | 4/2013 | Lee et al. | |
| 8,442,602 B2 | 5/2013 | Wong et al. | |
| 8,541,974 B2 | 9/2013 | Farahani | |
| D693,814 S | 11/2013 | Park | |
| D694,228 S | 11/2013 | Richter | |
| 8,690,600 B1 | 4/2014 | Zeolla | |
| 8,727,192 B2 | 5/2014 | Lai | |
| 8,750,948 B2 | 6/2014 | Wong et al. | |
| 8,755,851 B2 | 6/2014 | Kim et al. | |
| 8,907,752 B2 | 12/2014 | Wodrich et al. | |
| 9,026,187 B2 | 5/2015 | Huang | |
| 9,048,665 B2 | 6/2015 | Wojcik et al. | |
| 9,153,109 B1 | 10/2015 | Foster et al. | |
| D749,504 S | 2/2016 | Jeong et al. | |
| 9,318,915 B2 | 4/2016 | Miller et al. | |
| D762,571 S | 8/2016 | Lee et al. | |
| D772,813 S | 11/2016 | Wahl | |
| D784,259 S | 4/2017 | Huang et al. | |
| 9,667,076 B2 | 5/2017 | Lau et al. | |
| 9,698,632 B2 | 7/2017 | Davison et al. | |
| D797,042 S | 9/2017 | Miller et al. | |
| 9,774,192 B2 | 9/2017 | Wojcik et al. | |
| D802,529 S | 11/2017 | Andersson | |
| 9,812,892 B2 | 11/2017 | Miller et al. | |
| D810,015 S | 2/2018 | Carreon et al. | |
| 10,008,870 B2 | 6/2018 | Davison et al. | |
| 10,164,468 B2 | 12/2018 | Fitzgerald et al. | |
| 10,211,666 B2 | 2/2019 | Kim et al. | |
| 10,225,716 B2 | 3/2019 | Terlizzi | |
| D845,897 S | 4/2019 | Kim | |
| 2002/0075003 A1 | 6/2002 | Fridman et al. | |
| 2002/0085403 A1 | 7/2002 | Cho | |
| 2003/0045246 A1 | 3/2003 | Lee et al. | |
| 2003/0095374 A1 | 5/2003 | Richardson | |
| 2003/0220988 A1 | 11/2003 | Hymel | |
| 2005/0188203 A1 | 8/2005 | Bhaskaran et al. | |
| 2005/0189913 A1 | 9/2005 | Vitanov et al. | |
| 2005/0224508 A1 | 10/2005 | Tajiri et al. | |
| 2005/0279661 A1 | 12/2005 | Hodges | |
| 2006/0022889 A1 | 2/2006 | Chiang et al. | |
| 2006/0244422 A1 | 11/2006 | DiGiovanna et al. | |
| 2006/0255493 A1 | 11/2006 | Fouladpour | |
| 2006/0261777 A1 | 11/2006 | Li et al. | |
| 2007/0013341 A1 * | 1/2007 | Hitomi | H02J 7/00036 320/112 |
| 2007/0052600 A1 | 3/2007 | Kamitani et al. | |
| 2007/0071423 A1 | 3/2007 | Fantone et al. | |
| 2007/0115387 A1 | 5/2007 | Ho | |
| 2007/0138920 A1 | 6/2007 | Austin et al. | |
| 2007/0146985 A1 | 6/2007 | Mick et al. | |
| 2007/0158220 A1 | 7/2007 | Cleereman et al. | |
| 2007/0226527 A1 | 9/2007 | Ang | |
| 2008/0011917 A1 | 1/2008 | Adams | |
| 2008/0164855 A1 | 7/2008 | Tam et al. | |
| 2008/0269724 A1 | 10/2008 | Sarkinen et al. | |
| 2008/0272741 A1 | 11/2008 | Kanamori | |
| 2008/0315826 A1 | 12/2008 | Alberth et al. | |
| 2008/0316687 A1 | 12/2008 | Richardson et al. | |
| 2009/0001927 A1 * | 1/2009 | Stamos | H02J 7/0048 320/106 |
| 2009/0017884 A1 | 1/2009 | Rotschild | |
| 2009/0037284 A1 | 2/2009 | Lewis et al. | |
| 2009/0039833 A1 * | 2/2009 | Kitagawa | H01M 10/46 320/134 |
| 2009/0051223 A1 | 2/2009 | Woo | |
| 2009/0066529 A1 | 3/2009 | Fukada | |
| 2009/0106567 A1 | 4/2009 | Baarman | |
| 2009/0115369 A1 | 5/2009 | Lin et al. | |
| 2009/0186264 A1 | 7/2009 | Huang | |
| 2009/0284216 A1 | 11/2009 | Bessa et al. | |
| 2009/0322158 A1 | 12/2009 | Stevens et al. | |
| 2010/0003950 A1 | 1/2010 | Ray et al. | |
| 2010/0093412 A1 | 4/2010 | Serra et al. | |
| 2010/0124040 A1 | 5/2010 | Diebel et al. | |
| 2010/0156344 A1 | 6/2010 | Inoue et al. | |
| 2010/0171234 A1 | 7/2010 | Lee et al. | |
| 2010/0270970 A1 | 10/2010 | Toya et al. | |
| 2010/0317413 A1 | 12/2010 | Tan | |
| 2010/0323616 A1 | 12/2010 | Novak et al. | |

(56) References Cited

U.S. PATENT DOCUMENTS

| | | |
|---|---|---|
| 2011/0050164 A1 | 3/2011 | Partovi et al. |
| 2011/0159324 A1 | 6/2011 | Huang et al. |
| 2011/0163714 A1 | 7/2011 | Ettes et al. |
| 2011/0260681 A1 | 10/2011 | Guccione et al. |
| 2012/0019057 A9 | 1/2012 | Kirby et al. |
| 2012/0028691 A1 | 2/2012 | Koehl |
| 2012/0088558 A1 | 4/2012 | Song |
| 2012/0091950 A1 | 4/2012 | Campanella et al. |
| 2012/0106037 A1 | 5/2012 | Diebel et al. |
| 2012/0112691 A1 | 5/2012 | Kurs et al. |
| 2012/0178505 A1 | 7/2012 | Yang et al. |
| 2012/0235792 A1 | 9/2012 | Huang et al. |
| 2012/0254479 A1 | 10/2012 | Matsuoka |
| 2012/0274395 A1* | 11/2012 | Deam ............. H02J 7/0031 327/538 |
| 2012/0303520 A1 | 11/2012 | Huang |
| 2012/0306431 A1 | 12/2012 | Li et al. |
| 2012/0314354 A1 | 12/2012 | Rayner |
| 2012/0316811 A1 | 12/2012 | Choi et al. |
| 2012/0319487 A1 | 12/2012 | Shah |
| 2013/0038279 A1 | 2/2013 | Seyerle et al. |
| 2013/0069583 A1 | 3/2013 | Lemelman et al. |
| 2013/0119922 A1 | 5/2013 | Chen et al. |
| 2013/0206844 A1 | 8/2013 | Chen et al. |
| 2013/0214730 A1 | 8/2013 | Lu et al. |
| 2013/0220841 A1 | 8/2013 | Yang |
| 2013/0234481 A1 | 9/2013 | Johnson |
| 2013/0262248 A1 | 10/2013 | Kim et al. |
| 2014/0065948 A1 | 3/2014 | Huang |
| 2014/0091758 A1 | 4/2014 | Hidaka et al. |
| 2014/0117921 A1 | 5/2014 | Suomela |
| 2014/0191033 A1 | 7/2014 | Wojcik et al. |
| 2014/0191724 A1 | 7/2014 | Wojcik et al. |
| 2014/0210406 A1 | 7/2014 | Na et al. |
| 2014/0217965 A1 | 8/2014 | Wiemeersch et al. |
| 2014/0253024 A1 | 9/2014 | Rautiainen et al. |
| 2014/0306654 A1 | 10/2014 | Partovi |
| 2015/0111626 A1 | 4/2015 | Bell |
| 2015/0236550 A1 | 8/2015 | Yang et al. |
| 2015/0270734 A1 | 9/2015 | Davison et al. |
| 2015/0364938 A1 | 12/2015 | Lapetina et al. |
| 2016/0043584 A1* | 2/2016 | Sun ................. H01M 50/216 320/107 |
| 2016/0079793 A1 | 3/2016 | Cho et al. |
| 2016/0173667 A1 | 6/2016 | Gutierrez et al. |
| 2016/0211702 A1 | 7/2016 | Muratov et al. |
| 2016/0261133 A1 | 9/2016 | Wang |
| 2016/0294427 A1 | 10/2016 | Wojcik |
| 2017/0271893 A1* | 9/2017 | Brozek .............. H02J 7/0044 |
| 2018/0123361 A1* | 5/2018 | Gray ................. H02J 7/0022 |
| 2019/0131797 A1* | 5/2019 | Chen ................. H02J 7/0013 |
| 2020/0280198 A1 | 9/2020 | Kwon et al. |

FOREIGN PATENT DOCUMENTS

| | | |
|---|---|---|
| WO | 1994000037 A1 | 1/1994 |
| WO | 1999041958 A1 | 8/1999 |
| WO | 2012074151 A1 | 6/2012 |
| WO | 2012176206 A2 | 12/2012 |
| WO | 2013080068 A1 | 6/2013 |

OTHER PUBLICATIONS

Branscombe, "The future of Wireless Power: 2. Taking Wireless Power Further", Tom's Guide, Mar. 28, 2011, <http://www.tomsguide.com/us/Wireless-Power-Tesla-Fulton-eCoupled,review-1641-2.html>, last accessed Jun. 11, 2015.

Capdase CA00-C201 "PowerCup 2.2" Car Cup Holder Charger, available Dec. 2012, <http://www.amazon.in/Capdase-CA00-C201-Car-Mount-Holder/dp/B004OC5K1E> last accessed Jun. 11, 2015.

Channel Well, "Stackable Wireless Charging Power Bank Suite," downloaded from http://www.channelwell.com/en/Showroom/ugC_ShowroomItem_Detail.asp?hidshowid=26 Jul. 9, 2019, 4 pages.

Channel Well, "Wireless Charging (Qi Compatible Devices) with Power Bank)" product manual downloaded from http://www.channelwell.com/en/ImgShowroom/20160719165800.pdf on Jul. 9, 2019, 3 pages.

Haselton, "GM to Add Gadget Wireless Charging Feature to Cars in 2014", TechnoBuffalo.com, Aug. 24, 2014, <http://www.technobuffalo.com/2013/08/24/gm-wireless-charging-cars/>, last accessed Jun. 11, 2015.

Hornyak, Tim, "Exovolt stackable battery creates unlimited capacity," dated Aug. 10, 2012, downloaded from https://www.cnet.com/news/exovolt-stackable-battery-creates-unlimited-capacity/ Jul. 9, 2019, 6 pages.

I-Blades, "Mciro USB Smartblade(R) +sdCard reader," downloaded from https://i-blades.com/products/external-phone-battery-pack-power-memory-usb-flash-drive Jul. 9, 2019, 5 pages.

Kurs et al., "Wireless Power Transfer via Strongly Coupled Magnetic Resonances", Science, Jul. 6, 2007, pp. 83-86, vol. 317.

Kuyvenhoven et al., "Development of a Foreign Object Detection and Analysis Method for Wireless Power Systems", 2011 IEEE Symposium on Product Compliance Engineering (PSES) Oct. 10, 2011-Oct. 12, 2011, San Diego, CA., pp. 1-6.

Ogg, "Wireless Power Gets Recharged", CNET Wireless Power, Jan. 5, 2007, <http://news.cnet.com/Wireless-power-gets-recharged/2100-1041_3-6147684.html> last accessed Jun. 11, 2015.

Sengupta et al., "Universally Compatible Wireless Power Using the Qi Protocol", Low Power Design, 2011, pp. 1-6, <http://lowpowerdesign.com/article_TI-Qi.html> last accessed Apr. 11, 2014.

Silverstone Battery Pack Manual.

\* cited by examiner

STACKABLE BATTERY PACK WITH WIRELESS CHARGING

CROSS REFERENCE TO RELATED APPLICATIONS

The present application is a continuation of U.S. patent application Ser. No. 16/400,489, filed May 1, 2019, which claims priority to U.S. Provisional Patent Application No. 62/718,521, filed Aug. 14, 2018, all of which are hereby incorporated by reference in their entireties.

FIELD

This application relates to rechargeable battery backs for charging, recharging, and/or powering electronic devices.

BACKGROUND

Many types of portable electronic devices are available including smart phones (or smartphones), personal digital assistants (PDAs), tablet computers, laptop computers, phablets (phone/tablets), gaming devices, global positioning satellite (GPS) receivers, and multimedia players (such as mp3 players, video players, and the like). These devices typically operate using one or more batteries. In many cases, these batteries are rechargeable. These types of devices are often used in mobile or remote fashions and battery life can often be an issue. Increases in processing power and screen size often cause battery power to be consumed at an even higher rate than earlier devices. Consequently, battery life and access to a power source for recharging the batteries often become issues when using these types of devices. It is expected that the demands placed on battery-operated devices will continue to grow.

Manufacturers have developed portable power sources (e.g., portable batteries and battery packs) that can be transported and provide convenient access to power for powering or recharging various types of electronic devices. However, conventional portable batteries and power sources can sometimes be inconvenient for a variety of reasons. Conventional battery packs which use cables may be inconvenient in some circumstances for reasons such as: a need to remember carry the cable along with the battery pack, the inconvenience of storing the cable and keeping it untangled, and/or the need to attach the cable to both the battery pack and the device in order to charge the device. In addition, a user who carries his or her own battery pack with them must remember to recharge the battery pack.

SUMMARY

A rechargeable battery pack and battery pack system with improved features are disclosed herein. In one implementation, a rechargeable battery pack system includes a charging base and two or more rechargeable battery packs. The rechargeable battery packs are for use with electronic devices having wireless charging interfaces. The charging base may include an electrical connector configured for receiving electrical power from an external power source, electrical contacts, and an inductive coil configured for wirelessly transmitting at least a portion of the received electrical power to one of the electronic devices through the wireless charging interface of the electronic device when the one electronic device is in proximity to the charging base. Each of the battery packs may include a rechargeable battery, electrical circuitry, electrical contacts, and electrical pins. The battery packs may be stackable on the charging base such that a first one of the battery packs stacked directly on the charging base receives electrical power from the charging base for one or more of charging the rechargeable battery of the first battery pack and transferring electrical power to a second one of the two battery packs when the second battery pack is stacked directly on the first battery pack. Each battery pack may also include an inductive coil configured for wirelessly transmitting electrical power to an electronic device when the electronic device is in proximity to the battery pack.

In another variation, a rechargeable battery pack system includes a charging base and a plurality of rechargeable battery packs. The charging base includes an electrical connector configured for receiving electrical power into the charging base from an external power source and a set of electrical contacts. The plurality of rechargeable battery packs each include a rechargeable battery, electrical circuitry, and an inductive coil configured for wirelessly transmitting electrical power from the rechargeable battery to a wireless charging interface of an electronic devices when the electronic device is in proximity to the inductive coil. The rechargeable battery packs each further include a first set of electrical contacts configured to electrically contact a first device for receiving electrical power from the first device when the rechargeable battery pack is stacked on the first device. The first device may be the charging base or another of the plurality of rechargeable battery packs. The rechargeable battery packs further include a second set of electrical contacts configured to electrically contact the first set of electrical contacts of another of the plurality of rechargeable battery packs for providing electrical power to the other rechargeable battery pack when the other rechargeable battery pack is stacked on the rechargeable battery pack. The second set of electrical contacts is activated for providing the electrical power to the other rechargeable battery pack only after receiving an identity code from the other rechargeable battery pack and verifying the identity code.

In yet another example, a rechargeable battery pack system includes a first charging base configured for receiving electrical power from an external power source and a second charging base configured for receiving electrical power from an external power source. The system further includes a first portable battery pack and a second portable battery pack. The first portable battery pack has alignment features configured to mechanically interface to both the first charging base and the second charging base. The first portable battery pack is configured to be rechargeable by each of the first charging base and the second charging base, after transmitting a verifiable identification code to the respective charging base. The second portable battery pack also has alignment features configured to mechanically interface to both the first charging base and the second charging base. The second portable battery pack is configured to be rechargeable by the second charging base after transmitting a verifiable identification code to the second charging base, but is not rechargeable by the first charging base.

In yet another example, a rechargeable battery pack for use with a charging base a rechargeable battery includes electrical circuitry and an inductive coil configured for wirelessly transmitting electrical power from the rechargeable battery to a wireless charging interface of an electronic device when the electronic device is in proximity to the inductive coil. The rechargeable battery pack also includes a first set of electrical contacts configured to electrically contact a first device for receiving electrical power from the first device when the rechargeable battery pack is stacked on the first device. The first device may be, alternately, one of the charging base and another instance of the rechargeable battery pack. The rechargeable battery pack further includes a second set of electrical contacts configured to electrically contact the first set of electrical contacts of another instance of the rechargeable battery pack for providing electrical power to the other rechargeable battery pack when the other rechargeable battery pack is stacked on the rechargeable battery pack. The second set of electrical contacts is activated for providing the electrical power to the other rechargeable battery pack after receiving an identification code from the other rechargeable battery pack and verifying the identification code is associated with a compatible device. The second set of electrical contacts may be positioned on an opposite side of the rechargeable battery pack from the position of the first set of electrical contacts.

Beneficially, the rechargeable battery packs described herein can be used to wirelessly recharge an electronic device, such as a smartphone. Eliminating the need to use a cable in the charging and/or discharging of the battery pack makes the processes easier for the user and may eliminate the need to carry a cable along with the battery pack. In addition, eliminating electrical connectors on the battery pack also makes the battery pack more resilient to damage and can reduce chances that it could be damaged by water, snow, rain, dust, dirt, or a contaminant or damaging element of another type. Reducing the number of connectors or cables can also make the rechargeable battery pack more compact, more aesthetically pleasing, and/or expand packaging options for the battery pack.

While there are benefits to eliminating cables as discussed above, cables may still be useful in some circumstances. In some configurations, a battery pack may include both the wireless charging/discharging capabilities discussed herein as well as cables and/or connectors for use with cables.

Various improvements are disclosed herein in the form of apparatuses, devices, components, systems, and methods. In some situations, improvements may include features implemented as non-transitory machine-executable computer instructions that may be executed by one or more computer processors to perform one or more of the improvements disclosed herein or to perform a portion of one or more of the improvements disclosed herein.

While many of the examples herein are discussed with respect to a "battery" pack, it should be understood that the techniques, improvements, apparatuses, systems, and methods disclosed herein are equally applicable to power packs or portable energy storage devices utilizing other methods of power storage including: fuel cells, lithium titanate cells, capacitive energy storage devices, super capacitors, kinetic energy storage devices, thermal energy storage devices, and/or combinations thereof. The claims are not to be limited to any particular type of power storage device.

BRIEF DESCRIPTIONS OF DRAWINGS

DETAILED DESCRIPTION

Figure 1:
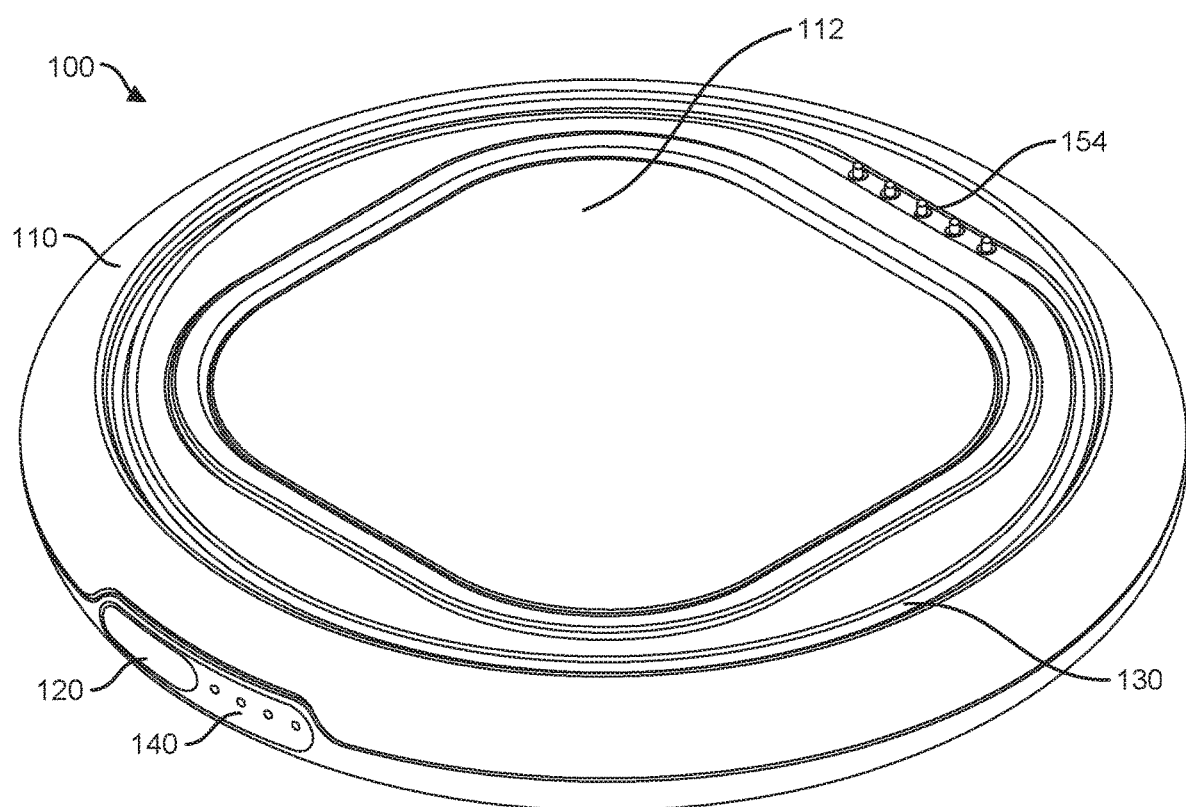
FIG. 1 illustrates a rechargeable battery pack.

FIG. 1 illustrates a battery pack 100. Any of the battery packs disclosed herein may also be referred to as a wireless battery packs, rechargeable battery packs, and/or portable battery packs, but for simplicity are often simply referred to as "battery packs." Battery pack 100 includes a housing 110 that supports or contains a variety of components, such as display elements 140, electrical port 160, button 120, and top alignment guide 130. Housing 110 also includes a top surface 112. Housing 110 may comprise two or more portions or members that are attached together to form housing 110.

Battery pack 100 may also contain a number of internal components that are not visible in FIG. 1 such as a printed circuit board, a rechargeable battery, electrical components, discrete components, electrical circuitry, analog components, digital components, a microprocessor, a microcontroller, memory, a voltage controller, a voltage booster, a current limiter, a battery charge controller, a battery monitor, electromechanical connectors, an electrical coil, an inductive electrical coil, a modulator, a demodulator, an rf transmitter, an rf receiver, an antenna, a filter, a mixer, and/or an amplifier.

Display element(s) 140 comprise one or more devices for visually conveying status or information to a user of battery pack 100. Display element(s) 140 may include one or more of: a light emitting diode (LED), an organic light emitting diode (OLED), a liquid crystal display (LCD), electronic paper, electrophoretic ink, and/or another type of device for visually conveying information to a user, including combinations thereof. Display element(s) 140 may be made up of a group of discrete display elements, such as a group of LEDs. Display element(s) 140 may also be made up of a single display device, such as an LCD, containing a plurality of display elements, segments, or areas. Display elements(s) 140 may be illuminated in a variety of combinations, sequences, colors, patterns, and/or intensities to convey various information about an operating mode, status, and/or condition of battery pack 100. They may also convey information about a battery of battery pack 100 and/or another device to which battery pack 100 is interfaced. Battery pack 100 may also convey information using an audio device for generating an audible signal which may include a speaker, a buzzer, a beeper, a piezoelectric device, and/or a combination thereof.

Electrical contacts 154 of battery pack 100 are used for conducting electrical power and/or data signals. Electrical contacts 154 may be any type of conductive electrical contacts, probes, pins, and/or pads for making electrical contact to another device. Electrical contacts 154 may be spring loaded, floating, movable, and/or have play for more easily and reliably making contact to other devices. In one specific example, pogo pins may be used. Electrical contacts 154 are at or near a plane of top surface 112 such that they may contact a device which is place or stacked on top of battery pack 100. While five electrical contacts are illustrated, other quantities are possible including two, three, four, six, seven, or more. The electrical contacts may be separate elements or may comprise single assembly.

In some configurations, an industry standard electromechanical connector may be used in place of or in addition to electrical contacts 154. In some examples, electrical contacts 154 and/or electrical contacts 152 (discuss in detail below with respect to FIG. 2) may be recessed from the surface or be positioned in a recessed area to reduce chances of unintended contact. In other examples, electrical contacts 154 and/or electrical contacts 152 may have one or more raised or protruding housing portions around them to reduce chances of unintended contact.

Button 120 includes one or more devices through which a user may provide an input to battery pack 100. Button 120 may include a switch, a group of switches, a button, a group of buttons, an optical detector, a touch sensitive device, a proximity sensor, a capacitance sensor, or a combination thereof. As described later in further detail, button 120 may be used to switch battery pack 100 on, to switch battery pack 100 off, to change an operational mode of battery pack 100, to select a feature of battery pack 100, to deselect a feature of battery pack 100, or a combination thereof.

The one or more rechargeable batteries included in battery pack 100 may be configured for supplying power to one or more other devices, as well as to internal components of battery pack 100. The rechargeable battery(s) may comprise one or more of a variety of electrical power storage technologies including lithium ion (Li-ion), lithium ion polymer (Li-ion polymer), lead-acid, nickel cadmium (NiCd), nickel metal hydride (NiMH), nickel-zinc, alkaline, fuel cells, lithium titanate cells, capacitive energy storage devices, super capacitors, and/or any other type of device for storing energy. While the term "battery" is primarily used herein for purposes of explanation, the apparatuses, methods, systems, and techniques described herein are applicable for use with any power or energy storage technology. The apparatuses, methods, and techniques described herein are not to be limited to any particular type of battery or energy storage technology.

The electrical circuitry of battery pack 100 may include one or more devices for controlling various elements of battery pack 100 and/or for performing processing functions. The electrical circuitry may include any type of microcontroller, microprocessor, microcomputer, programmable logic device, reconfigurable circuit, digital signal processor, or application specific circuit that is configured to communicate with other elements of battery pack 100 and/or to perform power management functions associated with battery pack 100. In some configurations, these power management functions may be described as 'intelligent' power management functions.

In some configurations, the electrical circuitry may also include communication circuitry to communicate with one or more electronic devices which battery pack 100 is interfaced with, either through a wired or wireless connection. The communication circuitry may also communicate with other devices, such as a charging base, and may make use of software, firmware, and/or another type of non-transitory computer executable program instructions stored in the device.

Wireless communication circuitry of battery pack 100 may include any device or combination of devices for enabling wireless communication between battery pack 100 and one or more electronic devices. The wireless communication, if any, may be compatible with one or more wireless communication standards, or industry standards, such as WIFI, BLUETOOTH, BLUETOOTH LOW ENERGY, NFC, ZIGBEE, and/or any other wireless communication standard, such as a cellular wireless communication standard. Wireless communication may also be conducted using optical or infrared communication methods. The wireless communication may include simplex, half-duplex, and/or full duplex communication.

Battery pack 100 may also include an electrical port 160 for receiving electrical power through a cable and/or transmitting electrical power through a cable. Electrical port 160 includes any electromechanical interface or connector for receiving or transmitting electrical power and/or data signals. Electrical port 160 may include any type of jack, plug, or electromechanical connector. For example, electrical port 160 may include a USB connector, a mini USB connector, a micro USB connector, a USB-C connector, an APPLE LIGHTNING connector, and/or any other type of electromechanical connector configured to conduct power and/or facilitate data communications. While one electrical port 160 is illustrated, battery pack 100 may include two or more electrical ports. Electrical port 160 may facilitate receiving electrical power from an external power source for recharging the battery. In some cases, an external electrical transformer or converter may also be used. Electrical port 160 may also facilitate sending electrical power from battery pack 100 to another device, such as a mobile phone, through a cable. Electrical port 160 may also facilitate communication with battery pack 100 for other purposes such as configuring, testing, or updating software or firmware.

In some configurations, electrical port 160 may be implemented in the form of an attached cable having an electrical connector at an end of the cable. In some examples, battery pack 100 may also operate as a charging base or include some or all of the charging base functions.

Figure 2:
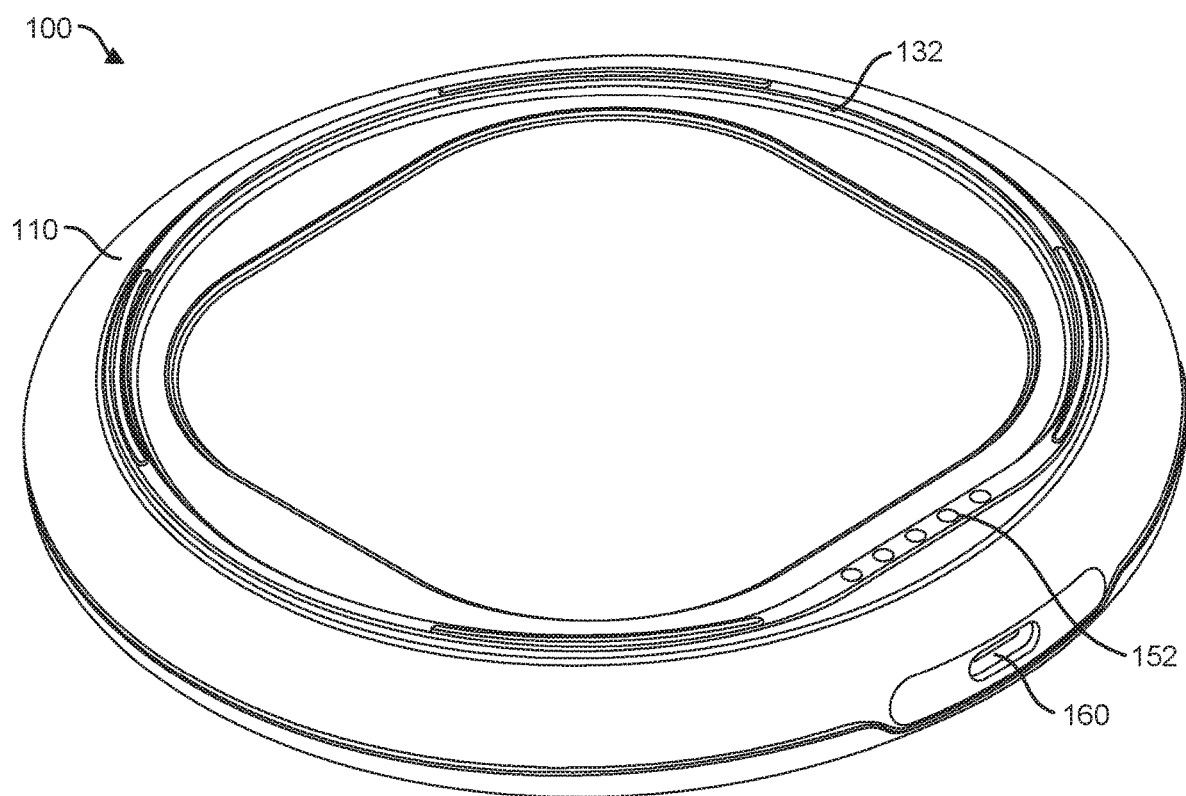
FIG. 2 illustrates a bottom perspective view of the rechargeable battery pack of FIG. 1.

FIG. 2 shows a bottom perspective view of battery pack 100 and illustrates electrical contacts 152 on the bottom of battery pack 100. Electrical contacts 152 may be any type of electrical contacts, probes, pins, prongs, and/or pads for making electrical contact to another device. Electrical contacts 152 may be spring loaded, movable, and/or have play for more easily and reliably making contact to other devices. While five electrical contacts are illustrated, other quantities are possible including two, three, four, six, seven, or more. FIG. 2 also illustrates bottom alignment guide 132 which is discussed in further detail below. In addition to positioning, aligning, or registering battery pack 100 with another device generally, bottom alignment guide 132 may serve to align electrical contacts 152 with a complementary set of contact, pins, sockets, pads, or probes. Electrical contacts 152 may be configured to engage, contact, or mate with electrical contacts 154 of another instance of battery pack 100. Electrical contacts 152 and electrical contacts 154 may be complementary. In one example, one of electrical contacts 152 and 154 may be pins while the other of electrical contacts 152 and 154 are contacts, sockets, or pin receptacles configured for being contacted by the pins.

Figure 3:
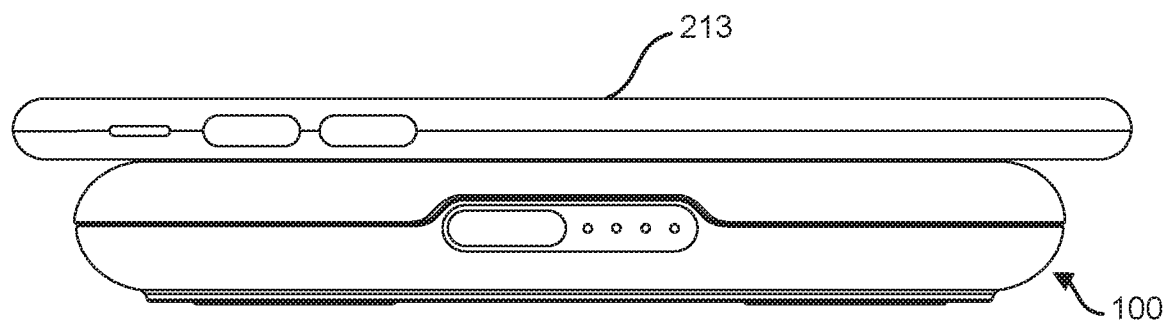
FIG. 3 illustrates the rechargeable battery pack of FIG. 1 charging an electronic device.

FIG. 3 illustrates battery pack 100 wirelessly charging an electronic device 213 which is sitting on top surface 112 of battery pack 100. Electronic device 213 may be any type of cell phone, smart phone, smartphone, personal digital assistant (PDA), tablet computer, laptop computer, phablet, wearable device, gaming device, global positioning satellite (GPS) receiver, and/or multimedia player which includes a rechargeable battery and wireless charging capabilities. Wireless charging permits electrical power to be transferred from or through an inductive coil of one device to an inductive coil of another device without any physical or cabled electrical interconnection between the two devices or coils. A number of wireless charging standards have developed for charging portable electrical or electronic devices.

These standards include, but are not limited to, Qi, PMA, and Powermat, as well as proprietary standards. The devices and techniques disclosed herein may be used with these or any other wireless charging standard, format, system, and/or protocol, including combinations thereof. Furthermore, wireless charging may be implemented using one or more resonant inductive coupling or charging techniques.

Figure 4:
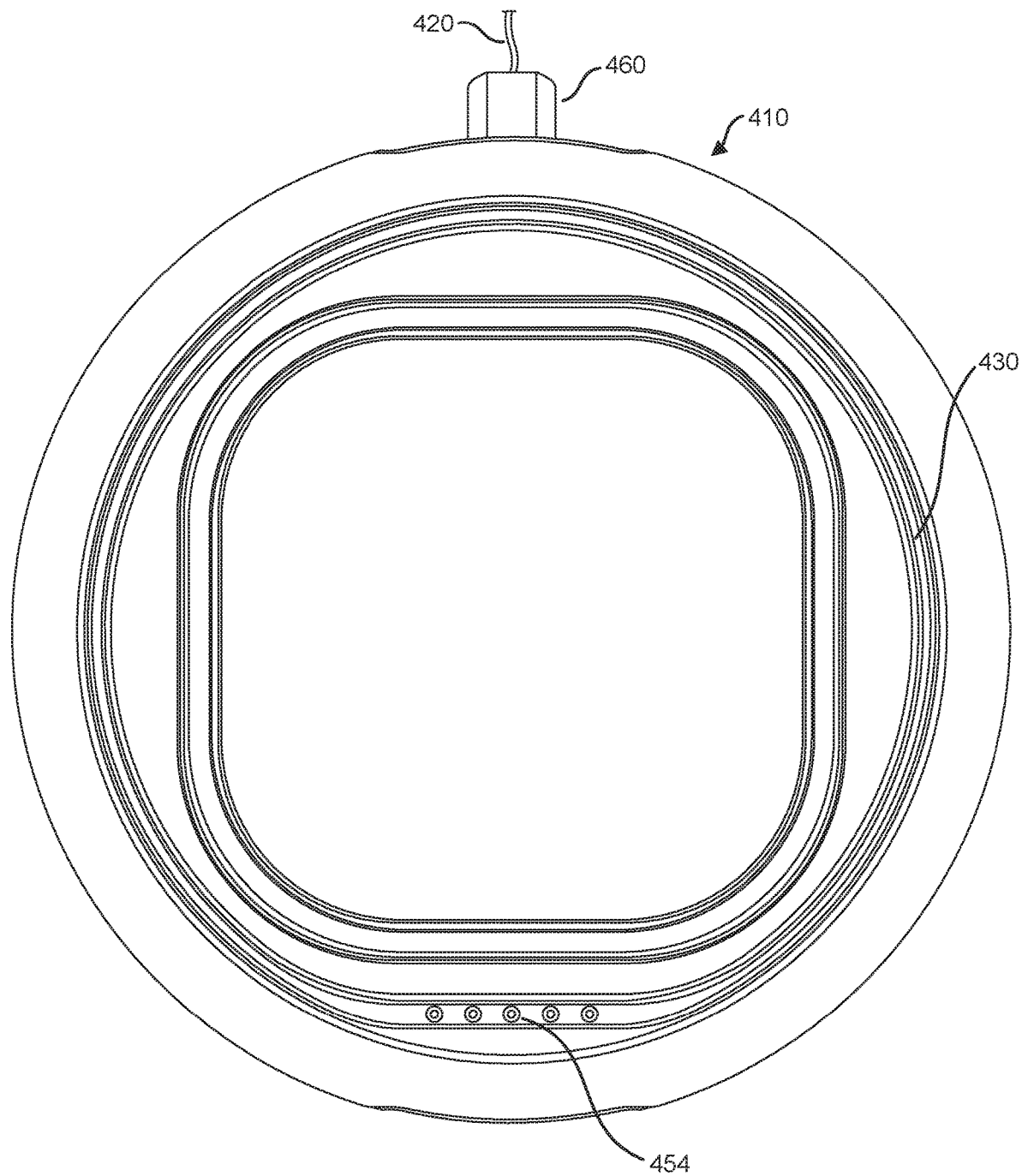
FIG. 4 illustrates a charging base.

FIG. 4 illustrates a charging base 410 that may be used with any of the rechargeable battery pack systems disclosed herein. In addition to the elements visible in FIG. 4, charging base 410 may include internal components inside housing 411. These internal components may include a printed circuit board, electrical components, discrete components, electrical circuitry, analog components, digital components, a microprocessor, a microcontroller, memory, a voltage controller, a voltage booster, a current limiter, a transformer, electromechanical connectors, an electrical coil, an inductive electrical coil, a modulator, a demodulator, an rf transmitter, an rf receiver, an antenna, a filter, a mixer, and/or an amplifier.

Charging base 410 may include or may be removably attachable to a cable 420 for receiving electrical power and/or data communications from another device. In one example, charging base 410 may receive power from an AC line power source, a wall charger, and/or a transformer. Cable 420 may be removable from charging base 410 and may attach to charging base 410 at or through an electrical port or connector on charging base 410.

Charging base 410 also includes electrical contacts 454. Electrical contacts 454 of charging base 410 are used for conducting electrical power and or data signals to battery pack 100 through electrical contacts 152. Electrical contacts 454 may be any type of conductive electrical contacts, probes, pins, and/or pads for making electrical contact to another device, such as battery pack 100. Electrical contacts 454 may be spring loaded, flexible, movable, and/or have play or travel for more easily and reliably making contact to other devices. While five electrical contacts are illustrated, other quantities are possible including two, three, four, six, seven, or more.

Charging base 410 also includes top alignment guide 430 for engaging or interfacing with bottom alignment guide 132 of battery pack 100 for orienting battery pack 100 with charging base 410 when battery pack 100 is set on top of charging base 410. Bottom alignment guide 132 and top alignment guide 430 may comprise any combination of one or more grooves, channels, slots, recesses, receptacles, ridges, fins, protrusions, tabs, pins, and/or other alignment features for aligning, orienting, and/or registering the two devices to each other. It is not necessary that these alignment features extend all the way around and edge or perimeter of the devices.

In some examples, the battery packs and/or charging bases disclosed herein may include one or more magnets for aligning the devices and the respective sets of electrical contacts when they are in a stacked configuration. The magnets may extend from an area near a top surface of the rechargeable battery pack to an area near a bottom surface of the rechargeable battery pack such that teach magnet attract objects proximate both the top and bottom surfaces of the rechargeable battery pack. The magnets may also serve to improve engagement of the electrical contacts and may cause one or more floating or spring-loaded electrical contacts to be depressed to improve the reliability of the associated electrical connection.

In some cases, charging base 410 may also include a button or switch, similar to button 120, for activating one or more features of charging base 410. Charging base 410 may also include one or more display elements, similar to display elements 140 for indicating a status, mode, configuration, and/or state of charging base 410.

Figure 5:
FIG. 5 illustrates the charging base of FIG. 5 with a stack of rechargeable battery packs.

FIG. 5 illustrates a battery pack system including charging base 410 with four battery packs stacked on top: battery pack 100, battery pack 101, battery pack 102, and battery pack 103. Battery packs 101, 102, and 103 are each examples of battery pack 100. More or fewer battery packs are possible. Beneficially, battery packs 100-103 can all be simultaneously charged while stacked together as illustrated in FIG. 5. A user may simply pick up the top battery pack from the stack and temporarily use it in another location to wirelessly charge an electronic device, as illustrated in FIG. 3.

In one example, the stack of battery packs in FIG. 5 is kept in a conference room, meeting room, or work area. Meeting attendees may pick up one of the battery packs for use during a meeting and return it to the stack when they leave. Beneficially, the battery packs are easily moved and used because they are not attached to the base by a cable and are convenient to operate because they charge a phone wirelessly. Further, when the battery packs are not in use and returned to the stack they are automatically recharged. Electrical power is transferred up through the stack to each of battery packs 100-103 through electrical contacts 454 of charging base 410 and electrical contacts 152 and electrical contacts 154 on each of battery packs 100-103. In another use model, the stack is kept in a restaurant or coffee shop and customers borrow or rent one of the battery packs 100-103 for use while they are present. In yet another use model, a family has one or more charging bases in a central location(s) in their home and the battery packs may be temporarily taken for use in different areas of the house.

When battery pack 100 is stacked on top of charging base 410 or on top of one of battery packs 101-103, the electrical contact that is formed between the two may include one or more pins or conductors for establishing communication between the two. In other words, one or more of electrical contacts 154 and/or electrical contacts 454 may make contact with electrical contacts 152 of a battery pack placed on top in order to establish communication between them. This communication may occur using any known format, protocol, standard, message structure, sequence, or modulation type common to the two devices. The communication may be conducted using any type of known electrical signals, data communication signals, binary signals, and/or analog signals. As described in further detail below, the communication may serve a variety of purposes. In some configurations, some of electrical contacts 152 and electrical contacts 154 may be dedicated to data communication while others are dedicated to power transfer. In other configurations, some of electrical contacts 152 and electrical contacts 154 may be used for both communication and power transfer purposes, either through time division multiplexing or by superimposing or modulating the communication signals while power transfer is taking place.

In one example, communication may be established between a newly placed battery pack and a device it is placed on top of (either another battery pack or a charging base) before electrical charging power is provided to the top battery pack. In this way, charging power may not be available at electrical contacts 154 and/or 454 continuously and/or may not be available until the communication has been established. Beneficially, this reduces the chance that a metal object may inadvertently come into contact with and/or short any of electrical contacts 154 or 454 thereby reducing the chance of damage to the product, accidental discharge, interfacing to an incompatible product, sparking, and/or fire. In other words, the power transfer contacts on top of the device may not be "live" until an acceptable device is placed on top and communication is established. Using this method, charging power may only be available at the power contacts of electrical contacts 154 and/or 454 only after the communication contacts of electrical contacts 154 and/or 454 have come into contact with each other and communication established with a compatible battery pack.

Once communication is established with a device placed above, the battery pack may activate, power, or enable a switch, a relay, a field effect transistor (FET), or similar device for selectively activating or turning on power to electrical contacts 154. Some of electrical contacts 154 may be active for purposes of performing the communication before the contacts carrying the electrical power are activated and/or before electrical power is made available at any of electrical contacts 154. In other configurations, the charging power conducted through a battery pack (from the charging base to a battery pack that is higher in the stack) may not be switchable and may be available at electrical contacts 154 any time it is provided at electrical contacts 152. Further, the battery pack may temporarily turn off or disable the wireless charging coil or circuitry when communication is established with a battery back above as it is known that the battery pack will not be wirelessly charging an electronic device while the other battery pack is present above.

In another example, communication may be established before charging power is provided from a charging base or a battery pack or to another battery pack placed on top in order to offer further control of the charging system. For example, a coffee shop or retail store may provide/rent battery packs for use in their establishment. However, the retailer may wish to deter people from taking the battery packs from the establishment and attempting to use them elsewhere and/or use them with another instance of a charging system at home or work. Therefore, the retailer may program the battery pack or system to work only with specified charging bases and/or battery packs. Each battery pack and/or charging base may have a unique identifier, identification number, identity code, key, or serial number. Controlled communication and one or more types of authentication or verification between the devices may also limit use of the devices with devices made or provided by other manufacturers. Many types of authentication are possible including serial number verification, passcode verification, single-factor authentication, two-factor authentication, as well as cryptographic techniques including public and private keys.

In some examples, the devices may be programmed to work with only certain other charger bases and/or battery packs even though they may be otherwise mechanically compatible. This feature may discourage theft of the devices because they will not operate with the other charging bases or battery packs, even though they may be a same brand, make, and/or type. For example, a company who purchases the products may program the products to work only with the other products they own (as identified by the unique identifiers, identity codes, or serial numbers) such that they cannot be used with the same make and/or model of these products owned by another party. The unique identifiers, identity codes, or serial numbers may be encoded, embedded in other data, or otherwise transformed such that the information cannot be easily recovered by simply monitoring or recording the communications between the devices. In other words, any combination of charging base and battery pack or pair of battery packs may perform a data handshake to verify that they are intended to be compatible or interoperable devices before one or more of the power contacts are activated for transferring electrical power.

In one specific example, there are two types of battery packs and two types of charging bases. One of the types of battery packs may be operable with only one of the types of charging bases while the other type of battery pack is only operable with the other type of charging base. Alternately, one of the types of battery packs may be operable with both types of charging bases, while the other type of battery pack is only operable with only one of the types of charging bases. The battery packs and/or charging base with interoperability that is more limited may be sold to customers using them in business, corporate, or public environments where theft may be an issue. In this way, users will be deterred from taking these battery packs home or to other locations because the battery packs will not be operable with the other (seemingly similar) charging base they may have at home and will become useless once discharged. In other words, the battery packs that are used in public or business settings may be only operable with a specific charging base or with a specific type of charging base or group of charging bases.

In yet another example, the battery packs disclosed herein may be programmable to work for only a certain period of time after being removed from the charging base. In other words, the battery pack may only provide charging power for 30 minutes, 1 hour, or 2 hours, etc. after being removed from the charging base even though it may not be fully discharged. The battery pack may have to be returned to the base to initiate or activate another use session. In this way, a retailer can control how long a customer uses the device and possibly indirectly the length of customer visits. This type of use limitation further deters removal of the battery pack from the premises. In some cases, such as in a coffee shop, the battery pack may be activated for further use or for another use session after another purchase is made.

Some examples of the battery packs discussed herein have standardized charging cables or ports, such as a USB port, such that they can be individually recharged through the port or cable in addition to being charged in the stack. However, battery packs that are used in public or business settings and may be subject to theft may not include a charging port or cable. This configuration further limits the ability to recharge the battery pack other than with a specific type of charging base and deters removal of the device from the premises because it cannot be recharged other than with the specific charging base, specific type of charging base, or specifically programmed charging base.

In other variations, there may be three, four, five, or more groups or types of devices (charging bases and battery packs) that are interoperable within the group, but not with charging bases or battery packs from other groups. The interoperability, or lack thereof, may be controlled by transmitting and/or exchanging of the unique identifiers, identification numbers, identity codes, or serial numbers. In these examples, each device may have a unique number or code and only certain groups of numbers or codes are interoperable. In another variation, the interoperable devices may share a same unique number or code. A device owner may be able to set their own code(s) such that only their devices are interoperable with each other further deterring theft or relocation of the devices. Many variations are possible.

In some configurations, the charging power received at each of the battery packs in a charging stack may be provided by only the charging base. In other words, referring to FIG. 5, any electrical charging power received by any of battery packs 100-103 may only be supplied by charging base 410. Battery packs 100-102 may be configured to not provide electrical power to other devices in the stack from their own rechargeable batteries. In this way, each of battery packs 100-103 may be configured to use the power it receives from the device below it in the stack in only two ways. First, it may use some of the received power to charge its own rechargeable battery. Second, it may pass on some of the received power to the device above it through electrical contacts 154. As described herein, making the power available to the device above may be subject to detecting and/or verification of the device above before the power is transferred to electrical contacts 154. In this way, the stacked devices may effectively create a power "bus" extending from charging base 410 up through the stack of battery packs 100-103. Each of battery packs 100-103 may draw power from the "bus" as needed, but "may not supply power to the bus as it passes through the battery pack. In addition, as described herein, each battery pack may optionally having the ability to switch the "bus" on and off depending on whether a proper device is detected above.

In other configurations, in contrast to the configuration discussed above, any one of battery packs 100-103 may be configured to charge another of battery packs 100-103 without the use or presence of a charging base. In other words, any one of battery packs 100-103 may be configured to charge another of battery packs 100-103 using its own internal rechargeable battery and/or using power received through a cable connected directly to the battery pack.

In some configurations, electronic device 213 may also be placed on top of battery pack 103 and wirelessly charged by battery pack 103 while battery pack 103 is stacked on one or more of the other battery packs or charging base (not illustrated). In other words, any of the battery packs may be capable of simultaneously being charged by charging base 410 through the stack, as well as wirelessly providing charging power to an electronic device, such as electronic device 213.

One or more software applications or sets of non-transitory computer instructions may be executed on any of the devices discussed herein having a microprocessor in order to program or configure any of the features or capabilities disclosed herein. The software application(s) may also be used to check the status of the devices, monitor their location, determine their health, determine their mode or status, determine their battery health or condition, and/or otherwise manage the devices in a pay-for-use or rental configuration. In some examples, a battery pack may be programmed or configured to only work for a specified duration or period of time before it must be reset or re-enabled by the owner. In this way, a device owner can limit the usage by someone borrowing or renting the device and further discourage the person from taking it to another location.

Figure 6:
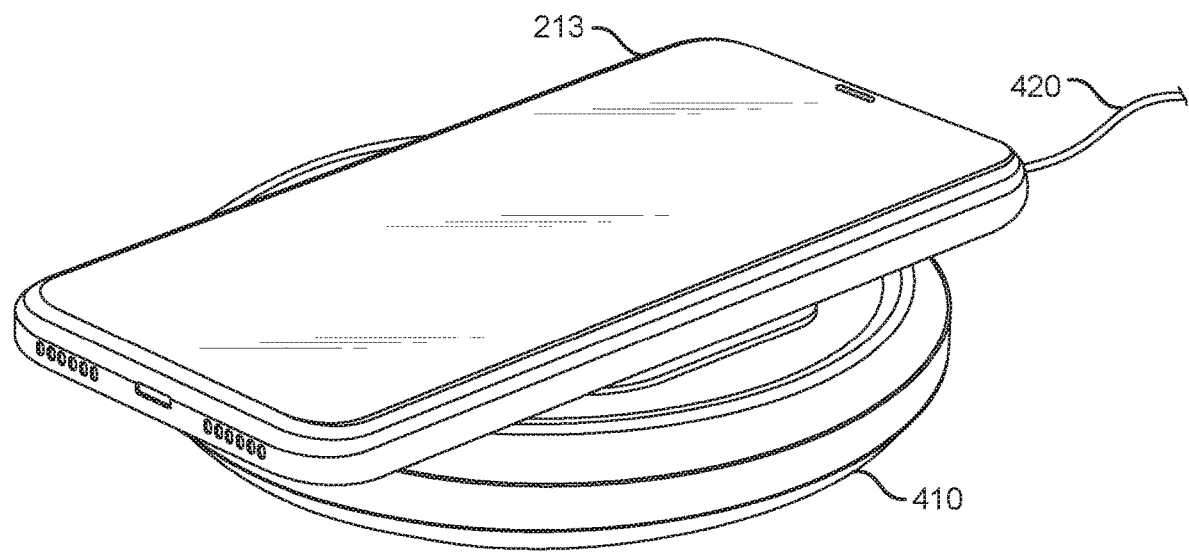
FIG. 6 illustrates the charging base of FIG. 4 charging an electronic device.

FIG. 6 illustrates charging base 410 charging electronic device 213 directly and wirelessly. In addition to being able to charge any one or more of battery packs 100-103 which may be placed on it through electrical contacts 454 (as illustrated in FIG. 5), charging base 410 may also include wireless charging circuitry, similar to that of battery packs 100-103, enabling it to wirelessly charge an electronic device which is placed upon it. In this way, charging base 410 can be used to directly charge an electronic device even if all of the associated battery packs are already in use or are currently discharged. In some examples, charging base 410 may not enable, activate, and/or power the wireless charging circuitry or coil until an electronic device is detected in proximity to the top surface of the charging base. Any of the battery packs disclosed herein may behave in a same or similar matter.

Figure 7:
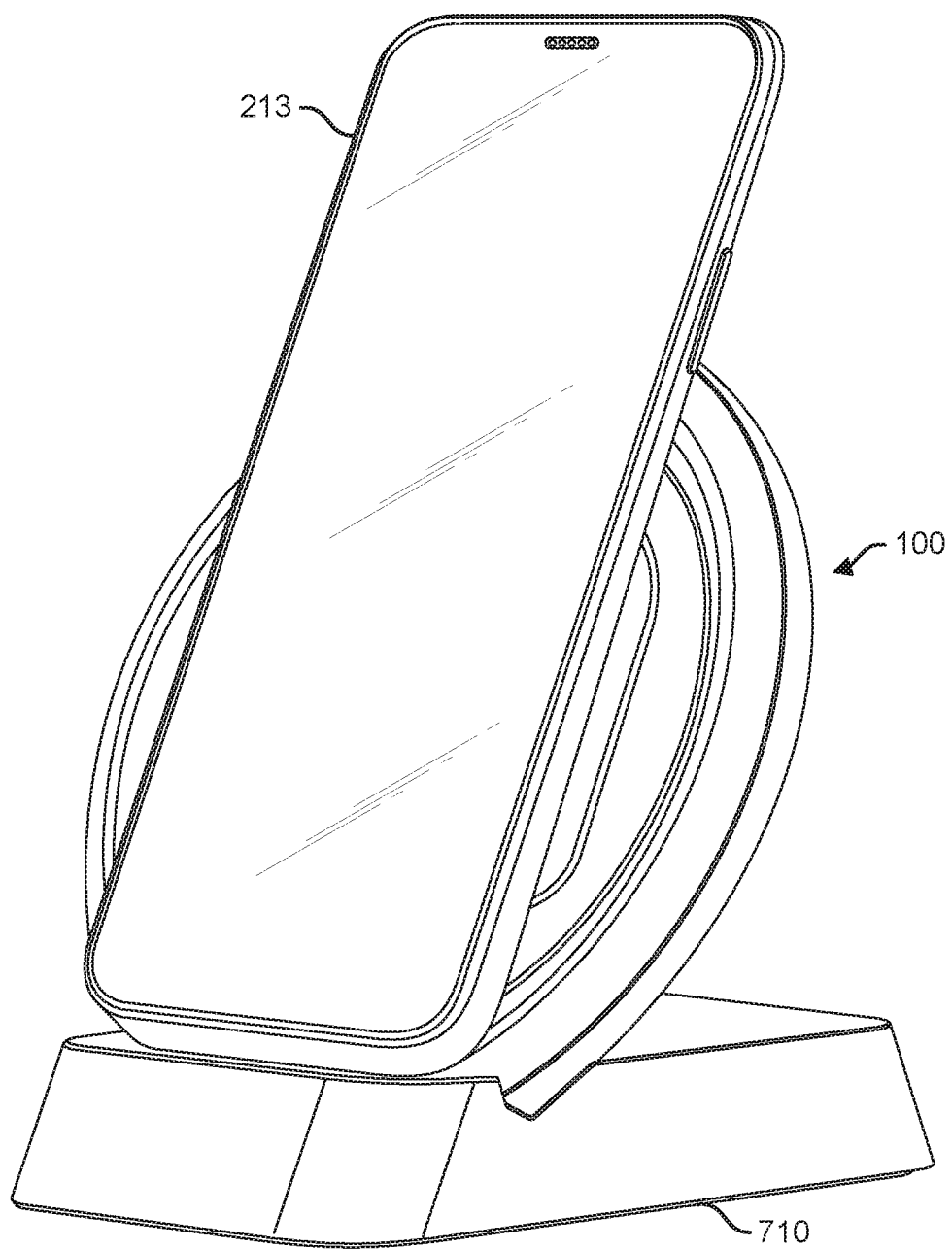
FIG. 7 illustrates a stand with an electronic device and the rechargeable battery pack of FIG. 1.

FIG. 7 illustrates a stand 710 with electronic device 213 and battery pack 100. Stand 710 may be configured to hold electronic device 213 in an upright, angled, tilted, or viewing position to enable a user to easily see the screen of the device while it is sitting on a table, desk, tray, or other substantially horizontal surface. Stand 710 may also hold battery pack 100 in a similar position such that it is adjacent to electronic device 213. This configuration enables battery pack 100 to wirelessly charge electronic device 213 while it is sitting in or on stand 710. Each of electronic device 213 and battery pack 100 may be temporarily removable from stand 710 while the other remains in place.

In some configurations, stand 710 may be a mechanical stand only and may include one or more openings and/or channels for routing a separate cable (not illustrated) to one or both of electronic device 213 and battery pack 100. In other configurations, stand 710 may include electrical components and may provide power to one or both of electronic device 213 and battery pack 100. In some configurations, power may be provided to stand 710 through a cable (not illustrated) which may be permanently attached or may be removably attachable to stand 710.

Figure 8:
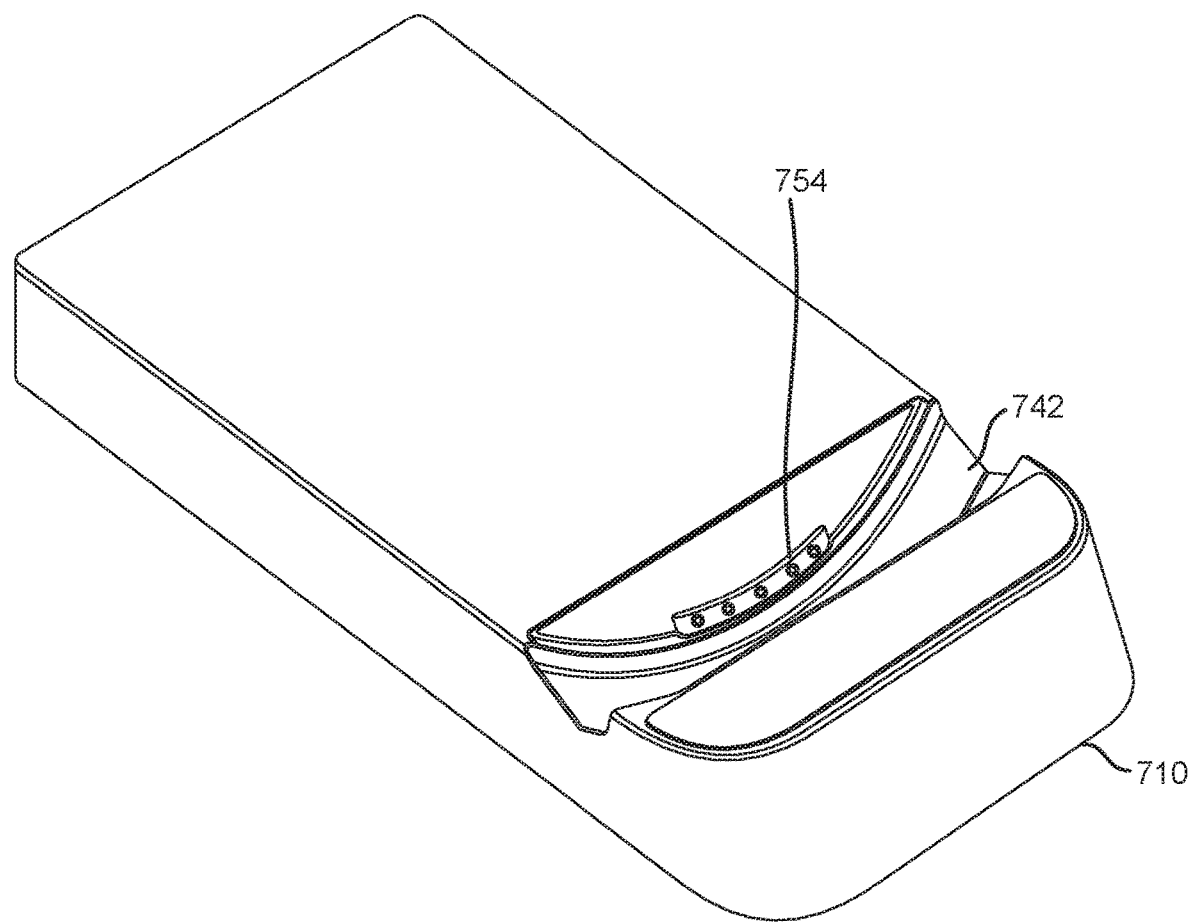
FIG. 8 illustrates a close-up view of a portion of the stand of FIG. 7.

FIG. 8 illustrates a close-up view of the variation in which stand 710 includes electrical contacts 754 for making contact with electrical contacts 152 of battery pack 100 when it is resting in slot 742 (in a configuration similar to that of FIG. 7). Electrical contacts 754 may provide power from a rechargeable battery contained in stand 710 or from an external power source that is connected to stand 710. Similarly, stand 710 may also contain electrical contacts or an electrical connector that interfaces directly to electronic device 213 when it is resting in slot 742. Stand 710 may use one or more magnets for aligning and facilitating good electrical contact with other devices.

Any combination of the devices, apparatuses, battery packs, charging bases, stands, and/or software disclosed herein may be configured in the form of a system or kit. A kit may have a single battery pack, multiple battery packs, a charging base, multiple charging bases, or any number of battery packs along with any number of charging bases.

Some or all of the steps and operations associated with the techniques introduced here may be performed by hardware components or may be embodied in non-transitory machine-executable instructions that cause one or more computer processors programmed with the instructions to perform the steps. Alternatively, the steps may be performed by a combination of hardware, software, and/or firmware.

The apparatuses, systems, methods, techniques, and components described herein are meant to exemplify some types of possibilities. In no way should the aforementioned examples limit the scope of the invention, as they are only exemplary embodiments.

The foregoing disclosure has been presented for purposes of illustration and description. Other modifications and variations may be possible in view of the above teachings. The examples described in the foregoing disclosure were chosen to explain the principles of the concept and its practical application to enable others skilled in the art to best utilize the invention. It is intended that the claims be construed to include other alternative embodiments of the invention except as limited by the prior art.

The phrases "in some embodiments," "according to some embodiments," "in the embodiments shown," "in other embodiments," "in some examples," "in some cases," "in some situations," "in one configuration," "in another configuration" and the like generally mean that the particular feature, structure, or characteristic following the phrase is included in at least one embodiment of the present invention and/or may be included in more than one embodiment of the present invention. In addition, such phrases do not necessarily refer to the same embodiments or different embodiments.

What is claimed is:

1. A rechargeable battery pack configured for use with a plurality of charging bases and with an electronic device having a wireless charging interface, the rechargeable battery pack comprising:
    a rechargeable battery;
    electrical circuitry;
    an inductive coil configured for wirelessly transmitting stored electrical power from the rechargeable battery to the wireless charging interface of the electronic device when the electronic device is positioned in proximity to the inductive coil of the rechargeable battery pack;
    a first set of electrical contacts located on a bottom surface of the rechargeable battery pack, the first set of electrical contacts positioned to interface with electrical contacts of the charging bases when the rechargeable battery pack is stacked on top of one of the charging bases, wherein the rechargeable battery pack is configured to transmit a first data communication including a first identification code from the electrical circuitry to the one charging base through the first set of electrical contacts, and wherein the rechargeable battery pack is further configured to receive first electrical power from the one charging base through the first set of electrical contacts after verification of the first identification code, wherein the transmitted first identification code is configured to cause the one charging base to send the first electrical power to the rechargeable battery pack, but will not cause another instance of the charging base that is programmed differently to send electrical power to the rechargeable battery pack; and
    a second set of electrical contacts located on a top surface of the rechargeable battery pack, the second set of electrical contacts configured to electrically contact a first set of electrical contacts of a second instance of the rechargeable battery pack for providing second electrical power to the second instance of the rechargeable battery pack when the second instance of the rechargeable battery pack is stacked on the rechargeable battery pack, wherein the second set of electrical contacts is configured to be activated for providing the second electrical power to the second instance of the rechargeable battery pack only after receiving a second data communication from the second instance of rechargeable battery pack through the second set of electrical contacts and verifying the second identification code;
    wherein the rechargeable battery pack is alternatively programmable to one of a first type and a second type, wherein the first identification code of the first type is compatible with both a first subset of the plurality of charging bases and a second subset of the plurality of charging bases that is different than the first subset of the plurality of charging bases, and the first identification code of the second type is compatible with the first subset of the plurality of charging bases but is not compatible with the second subset of the plurality of charging bases.

2. The rechargeable battery pack of claim 1 further comprising one or more magnets for aligning the first and second sets of electrical contacts with the electrical contacts of the charging base and with the electrical contacts of the second instance of the rechargeable battery pack, respectively.

3. The rechargeable battery pack of claim 2 wherein each of the one or more magnets extends from an area near the top surface of the rechargeable battery pack to an area near the bottom surface of the rechargeable battery pack and is configured to attract objects proximate both the top and bottom surfaces of the rechargeable battery pack.

4. The rechargeable battery pack of claim 1 wherein the second electrical power provided to the second instance of the rechargeable battery pack is only provided when the first electrical power is being received from the charging base.

5. The rechargeable battery pack of claim 1 wherein at least one of the first set of electrical contacts and the second set of electrical contacts of the rechargeable battery pack includes floating or spring-loaded contacts.

6. The rechargeable battery pack of claim 1 further comprising one or more display elements for displaying a mode or status of the rechargeable battery pack.

7. The rechargeable battery pack of claim 1 further comprising an electrical port that is separate from the first electrical contacts and the second electrical contacts, wherein the electrical port is configured for receiving electrical power from a first external device for recharging the rechargeable battery as well as providing electrical power from the rechargeable battery to a second external device.

8. A rechargeable battery pack configured for use with a plurality of charging bases and with an electronic device having a wireless charging interface, the rechargeable battery pack comprising:
    a rechargeable battery;
    electrical circuitry;
    an inductive coil configured for wirelessly transmitting electrical power stored in the rechargeable battery to the wireless charging interface of the electronic device when the electronic device is positioned in proximity to the inductive coil of the rechargeable battery pack;
    a first set of electrical contacts positioned on a bottom surface of the rechargeable battery pack, the first set of electrical contacts positioned to interface with electrical contacts of the charging bases, respectively, wherein the rechargeable battery pack is programmed to be compatible with a first subset of the plurality of charging bases and the electrical circuitry is configured to transmit a first data communication including a first identification code to one of the charging bases through the first set of electrical contacts, and wherein the rechargeable battery pack is further configured to receive first electrical power from the one charging base through the first set of electrical contacts if the one charging base is one of the first subset of the plurality of charging bases with which the rechargeable battery pack is compatible as determined based on the transmitted first identification code; and
    a second set of electrical contacts positioned on a top surface of the rechargeable battery pack, the second set of electrical contacts configured to electrically contact a first set of electrical contacts of a second instance of the rechargeable battery pack for providing second electrical power to the second instance of the rechargeable battery pack when the second instance of the rechargeable battery pack is stacked on the rechargeable battery pack, wherein the second electrical power provided to the second instance of the rechargeable battery pack is a portion of the first electrical power received from the one charging base;

wherein the rechargeable battery pack is one of a first type and a second type, the first identification code of the first type is compatible with both the first subset of the plurality of charging bases and a second subset of the plurality of charging bases that is different than the first subset of the plurality of charging bases, and the first identification code of the second type is compatible with the first subset of the plurality of charging bases but is not compatible with the second subset of the plurality of charging bases.

9. The rechargeable battery pack of claim 8 wherein the rechargeable battery pack is programmed to be the first type and further comprises an electrical port that is separate from the first electrical contacts and the second electrical contacts, wherein the electrical port is configured for receiving electrical power from an external device for recharging the rechargeable battery.

10. The rechargeable battery pack of claim 9 wherein the electrical port is further configured for transmitting stored electrical power from the rechargeable battery to another device.

11. The rechargeable battery pack of claim 10 wherein the electrical port is a USB-C port.

12. The rechargeable battery pack of claim 8 wherein:
the first set of electrical contacts includes power contacts and data communication contacts;
the second set of electrical contacts includes power contacts and data communication contacts; and
wherein the electrical circuitry includes communication circuitry configured for conducting electrical data communications with at least one of the charging base and the second instance of the rechargeable battery pack through the respective data communication contacts.

13. The rechargeable battery pack of claim 8 wherein the second set of electrical contacts is configured to be activated for providing the electrical power to the second instance of the rechargeable battery pack only after receiving a second data communication from the second instance of rechargeable battery pack through the second set of electrical contacts and verifying the second identification code.

14. The rechargeable battery pack of claim 8 wherein the rechargeable battery does not provide the second electrical power.

15. A rechargeable battery pack system adapted for use with an electronic device having a wireless charging interface, the rechargeable battery pack system comprising:
a first charging base and a second charging base each having electrical contacts; and
a first rechargeable battery pack and a second rechargeable battery pack each comprising:
a rechargeable battery;
electrical circuitry;
an inductive coil adapted for wirelessly transmitting electrical power stored in the rechargeable battery to the wireless charging interface of the electronic device when the electronic device is positioned in proximity to the inductive coil of the first rechargeable battery pack;
a first set of electrical contacts located on a bottom surface of the first rechargeable battery pack, the first set of electrical contacts positioned to interface with the electrical contacts of the first charging base when the first rechargeable battery pack is stacked on top of the first charging base, wherein the first rechargeable battery pack is adapted to transmit a first data communication including a first identification code from the electrical circuitry to the first charging base through the first set of electrical contacts, and wherein the first rechargeable battery pack is further adapted to receive first electrical power from the first charging base through the first set of electrical contacts after verification of the first identification code; and
a second set of electrical contacts located on a top surface of the first rechargeable battery pack, the second set of electrical contacts adapted to electrically contact a first set of electrical contacts of the second rechargeable battery pack for providing second electrical power to the second rechargeable battery pack when the second rechargeable battery pack is stacked on the first rechargeable battery pack, wherein the second set of electrical contacts is adapted to be activated for providing the electrical power to the second rechargeable battery pack only after receiving a second data communication from the second rechargeable battery pack through the second set of electrical contacts and verifying the second identification code;
wherein,
the second rechargeable battery pack is configured differently than the first rechargeable battery pack;
the first rechargeable battery pack is electrically interoperable with the first charging base and the second charging base as determined by the first identification code in the first data communication; and
the second rechargeable battery pack is electrically interoperable with the first charging base but not with the second charging base as determined by the first identification code in the first data communication.

\* \* \* \* \*